(12) United States Patent
Sonderegger et al.

(10) Patent No.: US 6,876,809 B1
(45) Date of Patent: Apr. 5, 2005

(54) RELEASE MECHANISM FOR DISCONNECTING INTERNAL FIBER FROM AN OPTICAL MODULE

(75) Inventors: Mark Sonderegger, Kanata (CA); Balwantrai Mistry, Nepean (CA); Andrew Clarke, Nepean (CA)

(73) Assignee: Nortel Networks Limited, Ottawa (CA)

( * ) Notice: Subject to any disclaimer, the term of this patent is extended or adjusted under 35 U.S.C. 154(b) by 0 days.

(21) Appl. No.: 10/681,868

(22) Filed: Oct. 8, 2003

(51) Int. Cl.[7] .................................................. G02B 6/00
(52) U.S. Cl. .......................................................... 385/137
(58) Field of Search .................................. 385/135–138, 385/53

(56) References Cited

U.S. PATENT DOCUMENTS 6,550,977 B2 * 4/2003 Hizuka ........................ 385/55
6,745,911 B1 * 6/2004 Maestranzi ............... 213/75 R

* cited by examiner

Primary Examiner—Javaid H. Nasri
(74) Attorney, Agent, or Firm—Guerin & Rodriguez, LLP; Michael A. Rodriguez

(57) ABSTRACT

Described is a release mechanism for disconnecting internal fiber from an optical module. The optical module comprises a board, a faceplate, an adapter connected to the faceplate, a fiber optic cable assembly having a fiber optic cable and a release tab that connects the fiber optic cable to the adapter, and an actuator. The actuator is connected to the board for rotational movement about a pivot point between a first position in which the actuator is adjacent to the release tab of the fiber optic cable assembly and a second position in which the actuator engages the release tab and urges the release tab into an unlatched position so that the fiber optic cable assembly can be disconnected from the adapter of the optical module.

19 Claims, 5 Drawing Sheets

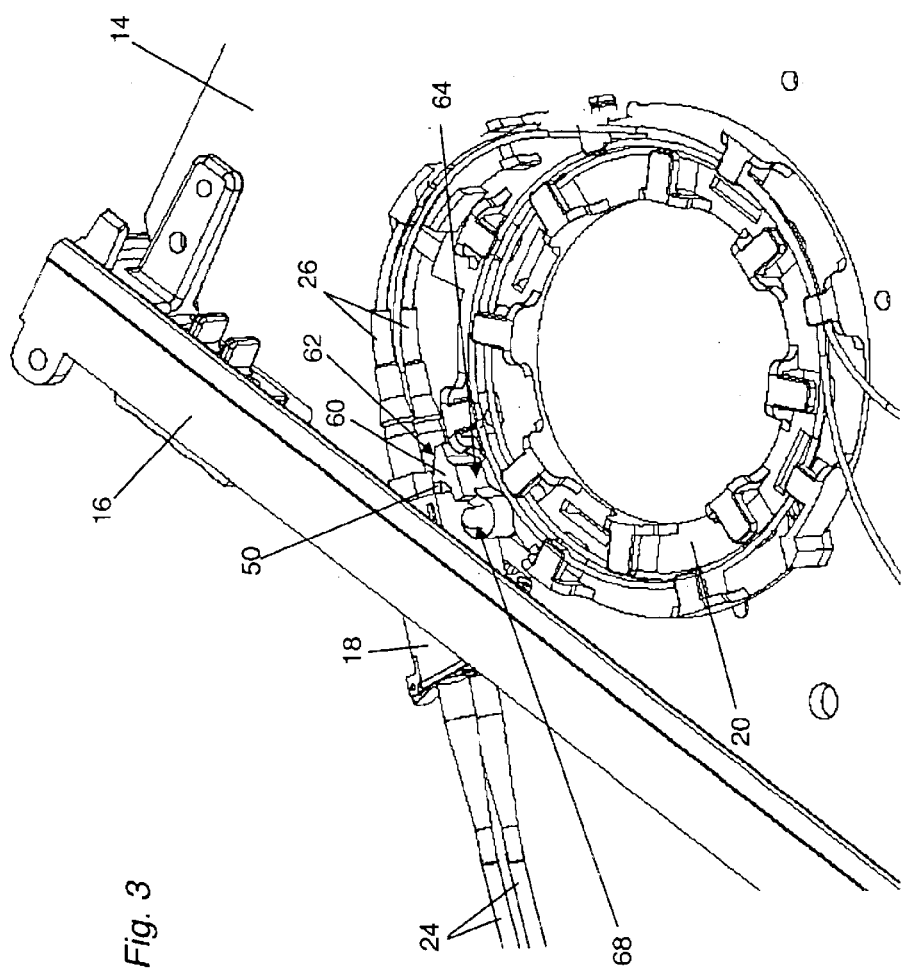

RELEASE MECHANISM FOR DISCONNECTING INTERNAL FIBER FROM AN OPTICAL MODULE

FIELD OF THE INVENTION

The invention relates generally to optical telecommunications systems. More particularly, the invention relates to a release mechanism for disconnecting fiber optic cables from an optical module.

BACKGROUND

In optical telecommunication systems, the ends of fiber optic cables periodically require cleaning to ensure effective communication. This cleaning involves fiber optic cables that enter an optical system, referred to as external fiber, and fiber optic cables within the optical system that communicate with the external fiber, referred to as internal fiber. To accomplish this cleaning, a technician disconnects the fiber optic cables at the interface where the external fiber and internal fiber meet. In some optical systems, however, the latches that secure the fiber optic cables to the interface are difficult for a technician to access and manipulate because of the small size and location of the latches on the optical module or board. Often in compact board designs other components on the board impede direct access to the latches. The technician is unable to reach the latches with a finger, and thus resorts to using a screwdriver or other object to reach and disengage the latches to disconnect the fiber optic cables from the optical module. If handled incorrectly, these objects can damage the fiber optic cables and other components on the board. Thus, there remains a need in compact board designs for a release mechanism that facilitates access to the latches of the fiber optic cables.

SUMMARY

In one aspect, the invention features an apparatus for disconnecting fiber optic cable assembly from an optical module. The optical module has a faceplate connected to a board and an adapter connected to the faceplate. The adapter has the fiber optic cable assembly connected thereto within the optical module. The apparatus comprises an actuator rotatably connected to the board for rotational movement about a pivot point. The actuator is disposed on the board adjacent to the release tab of the fiber optic cable assembly such that the rotational movement of the actuator urges the release tab into an unlatched position and enables the fiber optic cable assembly to be disconnected from the adapter.

In another aspect, the invention features an apparatus for activating a release tab of a fiber optic cable assembly to disconnect the fiber optic cable assembly from an adapter of an optical module. The apparatus comprises means disposed adjacent to the release tab of the fiber optic cable assembly for urging the release tab, and means for rotatably connecting the urging means to the board of the optical module to enable rotational movement of the urging means about a pivot point. The rotational movement of the urging means enables the fiber optic cable assembly to be disconnected from the adapter by urging the release tab of the fiber optic cable assembly into an unlatched position.

In yet another aspect, the invention features an optical module comprising a board and a faceplate connected to one end of the board. The faceplate is generally perpendicular to the board. The optical module also includes an adapter connected to the faceplate, a fiber optic cable assembly including a fiber optic cable and a release tab that connects the fiber optic cable to the adapter, and an actuator rotatably connected to the board for rotational movement about a pivot point. The actuator is disposed adjacent to the release tab of the fiber optic cable assembly such that the rotational movement of the actuator urges the release tab into an unlatched position and enables the fiber optic cable assembly to be disconnected from the adapter of the optical module.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 3 is another view of the external and internal fiber optic cables and bulkhead adapter with the fiber optic spool of FIG. 1, the fiber optic spool having an embodiment of a pivoting tab of the invention.

DETAILED DESCRIPTION

The present invention features a release mechanism for disconnecting an internal fiber optic cable (hereafter, internal fiber) from an optical module. The release mechanism facilitates access to the small and hard-to-reach release tabs of the internal fiber, and to thus to disconnect the internal fiber from the optical module without having to remove other components to reach the release tabs.

Figure 1:
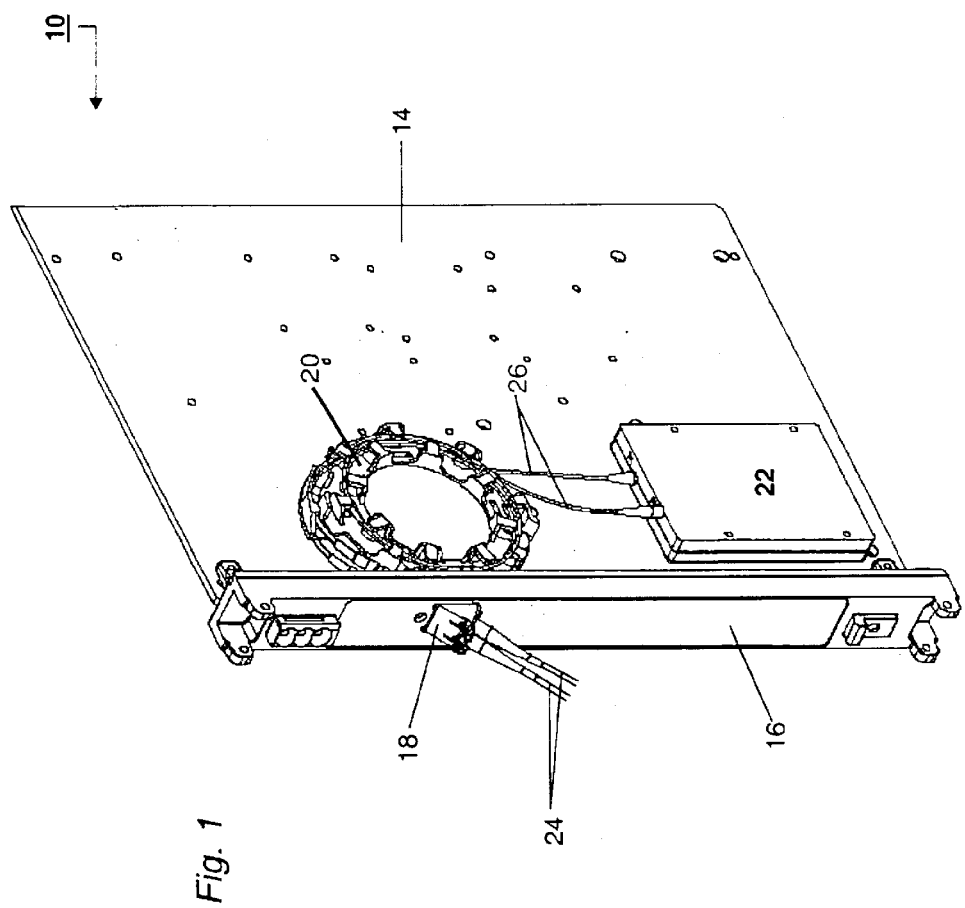
FIG. 1 is an isometric view of an embodiment of an optical module constructed in accordance with the principles of the invention, the optical module including a fiber optic spool and internal fiber optic cables joined to external fiber optic cables at a bulkhead adapter.

FIG. 1 shows an embodiment of an optical module 10, such as can be used in an optical communications system, constructed in accordance with the principles of the invention. The optical module 10 includes a printed circuit (PC) board or interface card 14 connected perpendicularly to a faceplate 16. In one embodiment, the optical module 10 is approximately 11" in height and 8" inches in depth. The faceplate 16 provides an Electromagnetic Compatibility (EMC) boundary for electromagnetic interference (EMI) produced by components connected to the PC board 14. A bulkhead adapter 18 is connected to and passes through the faceplate 16 at an angle to provide ingress and egress for optical signals passing into and out of the optical module 10 over fiber optic cables.

Connected to the board 14 are a fiber optic cable spool 20 (thereafter, fiber spool) and a transceiver module 22 for converting between optical and electrical signals. The fiber spool 20 is adjacent the bulkhead adapter 18. The PC board 14 has other components mounted thereon, but these componenets are not shown to more clearly illustrate the invention.

The optical module 10 includes a port for transmitting and receiving optical signals. The optical signals arrive at and leave the optical module 10 over a pair of fiber optic cables 24. One fiber optic cable of the fiber pair is for receiving optical signals and the other fiber optic cable is for transmitting optical signals. Hereafter, such fiber optic cables 24 are referred to as external fibers 24. Within the optical module 10, optical signals pass between the bulkhead adapter 18 and the transceiver module 22 over a pair of fiber optic cables 26. Hereafter, these fiber optic cables 26 are referred to as internal fiber 26. Similar to the external fiber 24, one of the internal fibers 26 is for receiving optical signals and the other is for transmitting optical signals.

Each internal fiber 26 terminates at an LC-type fiber optic cable assembly having an LC connector at one end. The LC connector has a "telephone jack" style latch-and-release mechanism (i.e., RJ45 style) that features a movable release tab. The LC connector connects one end of the internal fiber 26 to the EMC bulkhead adapter 18. The fiber spool 20 is mounted close to the bulkhead adapter 18 to receive the internal fiber 26. The release tabs 50 (see FIG. 2) of the internal fibers 26 face the fiber spool 20. The internal fiber 26 winds at least once around the fiber spool 20 and exits at the spool bottom. The other end of the internal fiber 26 is connected to the transceiver module 22.

Each external fiber 24 is, in one embodiment, a LC-type fiber optic cable assembly with an LC connector as described above for the internal fiber 26. The LC connector attaches each external fiber 24 to the bulkhead adaptor 18. The bulkhead adapter 18 holds the ends of the external fibers 24 within precise and close proximity of the ends of the internal fiber 26 to enable transmission of optical communication signals therebetween. The ends of the external and internal fibers may abut. These adjacent or abutting ends require cleaning to minimize transmission loss.

To clean the ends of the external fibers 24, the technician disconnects the external fibers 24 from the bulkhead adapter 18. For LC-type assemblies, the technician urges the release tab into an unlatched position (i.e., urges the release tab towards the body of the fiber optic cable assembly) and pulls the external fiber 24 from the bulkhead adapter 18. Because the LC connecter of each external fiber assembly is external to the optical module 10, the release tabs are reasonably accessible. With respect to cleaning each internal fiber 26, before the present invention, the small size of the release tab, its location and orientation on the PC board 14, the compact placement of electronic components on the board 14, and the location of the fiber spool 20 in close proximity to the release tab impeded a technician's direct access to the release tab. The present invention provides a release mechanism that overcomes these difficulties, as described in more detail below.

Figure 2:
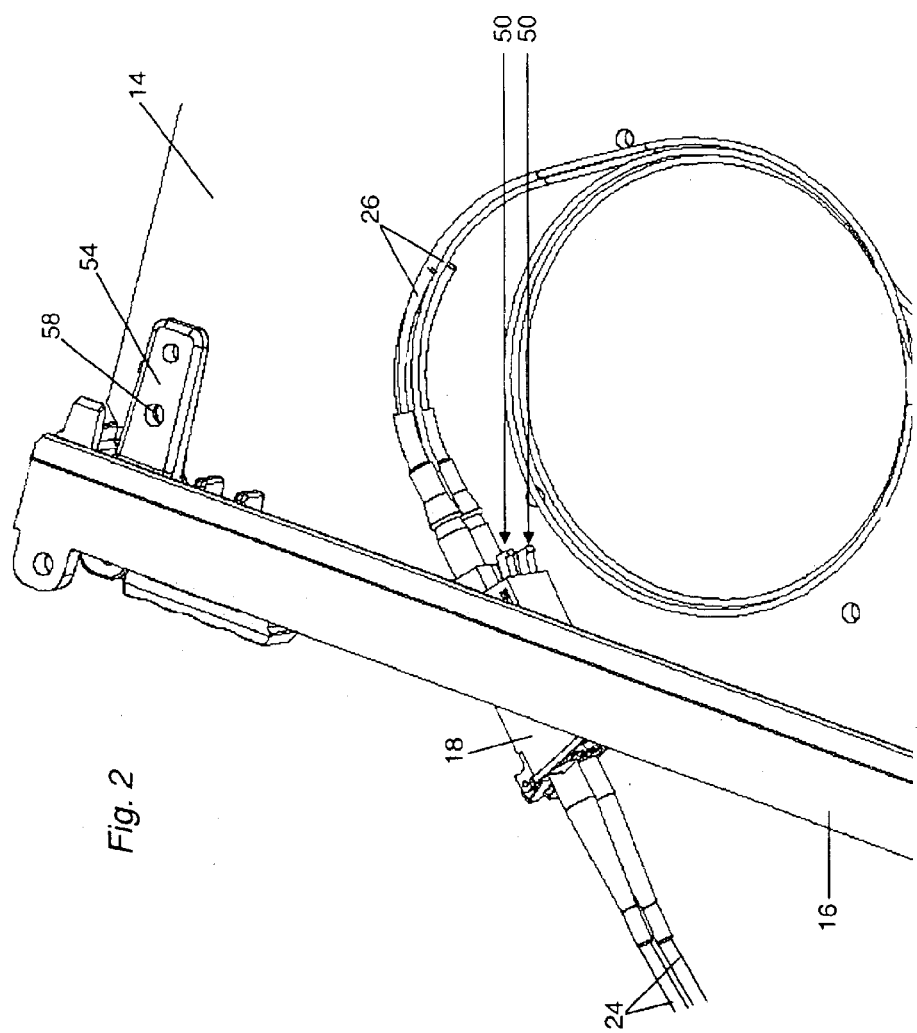
FIG. 2 is a closer view of the external and internal fiber optic cables, and bulkhead adapter of FIG. 1.

FIG. 2 shows the connection of the external fiber 24 and of the internal fiber 26 to the bulkhead adapter 18 in closer detail. The LC-type connector of each internal fiber 26 has a release tab 50. In FIG. 2, the fiber spool 20 of FIG. 1 is absent to more clearly show the orientation of the release tabs 50 with respect to the PC board 14, faceplate 16, bulkhead adapter 18, and internal fiber 26. The LC-type connector is inserted sufficiently into the bulkhead adapter 18 until the release tab 50 snaps into a latched position that secures the internal fiber 26 to the bulkhead adapter 18. The release tabs 50 are near the surface of the PC board 14. To provide an understanding of scale for the release tabs 50, FIG. 2 shows a bracket 54 for securing the faceplate 16 to the PC board 14. The bracket 54 has a fastener hole 58 with a 0.125" diameter. With this hole 58 as a reference of scale, it can be seen that each release tab 50 projects approximately 0.125 inches from one end of the bulkhead adapter 18.

FIG. 3 shows the fiber spool 20 and a release tab actuator 60 of the present invention, in addition to the external fiber 24, internal fiber 26, and bulkhead adapter 18 of FIG. 2. Adapted to fit into the compact spacing between the fiber spool 20, the bulkhead adapter 18, and the internal fiber 26, the release tab actuator 60 includes a front surface 62 and a back surface 64. The front surface 62 of the release tab actuator 60 is sloped and situated adjacent to the release tabs 50. The release tab actuator 60 is rotatably mounted to either the fiber spool 20 or to the PC board 14 at a pivot point 68. The back surface 64 provides a relatively large surface (i.e., compared to the surface of the release tab 50) against which the technician can apply a force, e.g., with his or her finger, to cause counterclockwise movement of the release tab actuator 60 around the pivot point 68. In one embodiment, the back surface 64 is approximately ¼ inch in thickness. Counterclockwise movement of the release tab actuator 60 causes the front surface 62 of the release tab actuator 60 to press against both release tabs 50, moving each release tab 50 out of the latched position into an open position. When the release tabs 50 are in the open position, the technician can pull one or both internal fibers 26 from the bulkhead adapter 18.

Figure 4B:
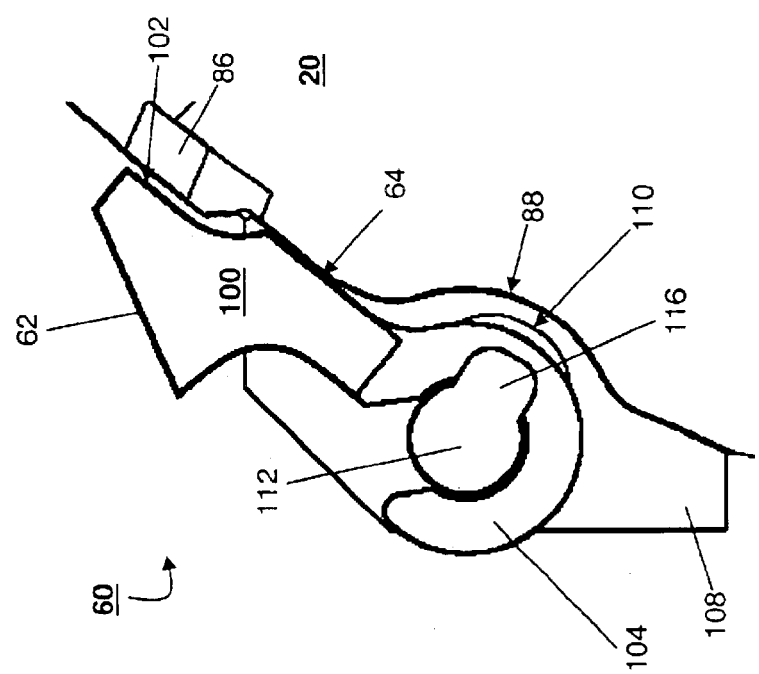
FIG. 4B is an enlarged side view of the insert of FIG. 4A of the release tab actuator of the invention.
Figure 4A:
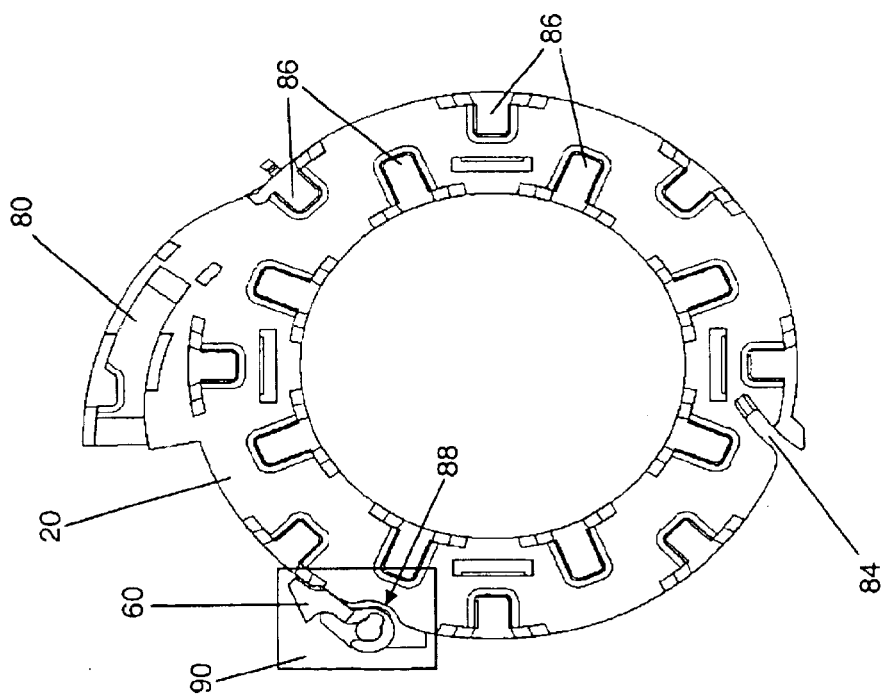
FIG. 4A is a side view of the fiber optic spool and pivoting release tab actuator of the invention without any fiber optic cables wound therein.

FIG. 4A shows a side view of one embodiment of the fiber spool 20 constructed in accordance with one embodiment of the invention. The fiber spool 20 includes a fiber entry portion 80 for receiving the internal fiber 26 and a fiber exit portion 84 from which the internal fiber 26 leaves the fiber spool 20 and passes to the transceiver module 22. The fiber entry portion 80 is at the top and the fiber exit portion 84 is at the bottom of the fiber spool 20. Fiber guides 86 guide the internal fiber 26 through the fiber spool 20. At the periphery of the fiber spool 20 is, at a counterclockwise position relative to the fiber entry portion 80, the release tab actuator 60 of the present invention. The fiber spool 20 is generally circular in shape, except at the fiber entry portion 80, at the fiber exit portion 84, and at the release tab actuator 60. An edge 88 of the fiber spool 20 near the release tab actuator 60 has an indented shape that accommodates the shape of the release tab actuator 60 and its rotational movement. In this embodiment, the release tab actuator 60 is part of the fiber spool 20. In another embodiment, the release tab actuator 60 is a separate component from the fiber spool 20 that is mounted on the PC board 14 adjacent to the fiber spool 20 at the indented edge 88.

FIG. 4B shows a side view in closer detail of the release tab actuator 60 shown in the insert 90 of FIG. 4A. The release tab actuator 60 includes a head portion 100 connected to a planar, curved hook portion 104. In addition to the sloped front surface 62 and planar back surface 64 described in connection with FIG. 3, the head portion 100 includes a curved back surface 102. The curved back surface 102 has a shape that conforms to the shape of one of the fiber spool guides 86. This fiber spool guide 86 defines the farthermost possible clockwise position of the head portion 100; that is, the back surface of the fiber spool guide 86 limits the clockwise rotation of the head portion 100 by the curved back surface 102 coming into contact with the fiber spool guide 86.

The insert 90 also includes a plate 108 having an opening 110 formed therein and a perpendicular post 112 having a knob 116. The post 112 extends perpendicularly from the PC board 104, and the plate 108 is part of the fiber spool 20. The opening 110 is shaped to receive the post 112 with the knob 116 when attaching the fiber spool 20 to the PC board 14. When the fiber spool 20 is mounted to the PC board 14, the plate 108 lies against the surface of the PC board 14 and provides a smooth surface upon which the release tab actuator 60 can rotate. The hook portion 104 loops around the post 112, and is disposed between the knob 116 of the post 112 and the plate 108. The knob 116 helps prevent the hook portion 104 from lifting off of the post 112. The post 112 operates as the pivot point around which the head portion 100 and hook portion 104 rotate in a counterclockwise position.

Figure 5B:
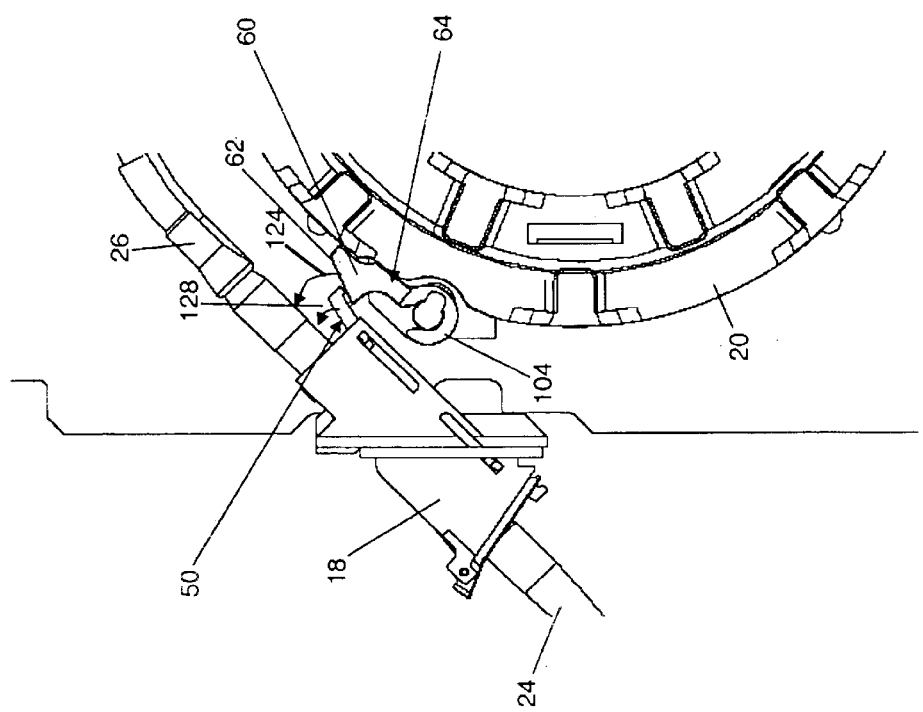
FIG. 5B is an enlarged side view of the release tab actuator contacting the release tabs of a fiber optic cable assemblies shown in the insert of FIG. 5A.
Figure 5A:
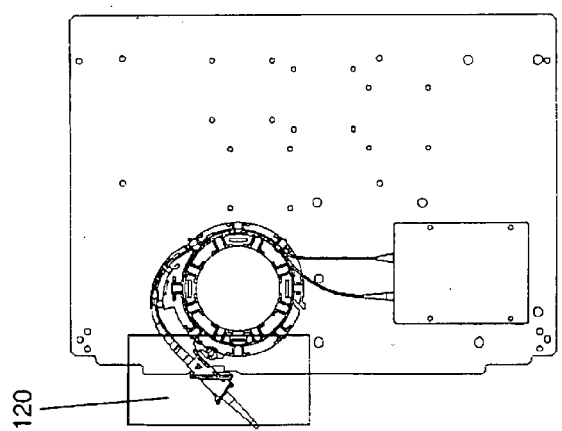
FIG. 5A is a side view of the optical module of FIG. 1.

FIG. 5A shows a side view of the optical module 10 of FIG. 1 and FIG. 5B shows an enlarged side view of the external and internal fibers 24, 26, the bulkhead adapter 18, and the release tab actuator 60. Reference is also made to FIG. 4A and FIG. 4B. As shown, the front surface 62 of the head portion 100 of the release tab actuator 60 is adjacent to or touching the fiber release tabs 50 (one of the tabs 50 is hidden behind the other tab 50). The technician pushes the back surface 64 of the head portion 100 to rotate the release tab actuator 60 counterclockwise about the pivot point 112 (as indicated by arrow 124). The counterclockwise rotation of the release tab actuator 60 urges the sloped front surface 62 of the head portion 100 against the release tabs 50. As a result, the release tabs 50 rotate towards the bodies of the fiber optic cable assemblies, as indicated by the arrow 128. This rotation moves both release tabs 50 from a latched position to an unlatched position. The technician can then pull one or both internal fibers 26 from the bulkhead adapter 18.

While the invention has been shown and described with reference to specific preferred embodiments, it should be understood by those skilled in the art that various changes in form and detail may be made therein without departing from the spirit and scope of the invention as defined by the following claims. For example, the release tab actuator described above is constructed for counterclockwise movement, in particular, because of the location of the release tabs of the fiber optic cable assemblies relative to the fiber spool. It is to be understood that for other embodiments of optical modules having different arrangements of the internal fiber, the fiber spool, and other components, a clockwise motion of the release tab actuator can be achieved, with slight changes in form and detail of the release tab actuator, for making contact that unlatch the release tabs.

What is claimed is:

1. In an optical module having a faceplate connected to a board and an adapter connected to the faceplate, the adapter having a fiber optic cable assembly connected thereto within the optical module, an apparatus for activating a release tab of the fiber optic cable assembly to disconnect the fiber optic cable assembly from the adapter, the apparatus comprising an actuator rotatably connected to the board for rotational movement about a pivot point, the actuator being disposed on the board adjacent to the release tab of the fiber optic cable assembly such that the rotational movement of the actuator urges the release tab into an unlatched position and enables the fiber optic cable assembly to be disconnected from the adapter.

2. The apparatus of claim 1, further comprising a fiber optic cable spool having the actuator formed at a periphery thereof, the fiber optic cable spool being connected to the board of the optical module such that the actuator is adjacent the release tab of the fiber optic cable assembly.

3. The apparatus of claim 1, wherein the actuator has a planar front surface that contacts the release tab of the fiber optic cable assembly when the actuator is rotated about the pivot point.

4. The apparatus of claim 1, wherein the pivot point is a post.

5. The apparatus of claim 4, wherein the actuator includes a hook portion that rotatably connects to the post.

6. The apparatus of claim 1, wherein the actuator has a planar back surface against which a user can apply a force to rotate the actuator about the pivot point.

7. The apparatus of claim 1, wherein the rotational movement for urging the actuator against the release tab is counterclockwise.

8. The apparatus of claim 1, wherein the fiber optic cable assembly is an LC-type assembly.

9. The apparatus of claim 1, wherein the actuator simultaneously engages a plurality of release tabs and simultaneously urges each release tab into an unlatched position when the actuator is rotated about the pivot point.

10. In an optical module having a faceplate connected to a board and an adapter connected to the faceplate, the adapter having a fiber optic cable assembly connected thereto within the optical module, an apparatus for activating a release tab of the fiber optic cable assembly to disconnect the fiber optic cable assembly from the adapter, the apparatus comprising:
    means disposed adjacent to the release tab of the fiber optic cable assembly for urging the release tab; and
    means for rotatably connecting the urging means to the board of the optical module to enable rotational movement of the urging means about a pivot point, the rotational movement of the urging means enabling the fiber optic cable assembly to be disconnected from the adapter by urging the release tab of the fiber optic cable assembly into an unlatched position.

11. The apparatus of claim 10, further comprising means for guiding fiber optic cable having the urging means formed thereon, the guiding means being mounted on the board of the optical module such that the urging means is disposed adjacent the release tab of the fiber optic cable assembly.

12. The apparatus of claim 10, wherein the urging means simultaneously engages a plurality of release tabs and simultaneously urges each release tab into an unlatched position when the urging means is rotated into the release tabs.

13. An optical module comprising:
    a board;
    a faceplate connected to one end of the board, the faceplate being generally perpendicular to the board;
    an adapter connected to the faceplate;
    a fiber optic cable assembly including a fiber optic cable and a release tab that connects the fiber optic cable to the adapter, and
    an actuator rotatably connected to the board for rotational movement about a pivot point, the actuator being disposed adjacent to the release tab of the fiber optic cable assembly such that the rotational movement of the actuator urges the release tab into an unlatched position and enables the fiber optic cable assembly to be disconnected from the adapter of the optical module.

14. The apparatus of claim 13, further comprising a fiber optic cable spool mounted to the board, the fiber optic spool having the actuator formed at a periphery thereof.

15. The apparatus of claim 13, wherein the pivot point is a post.

16. The apparatus of claim 15, wherein the actuator includes a hook portion that rotatably connects to the post.

17. The apparatus of claim 13, wherein the rotational movement of the actuator that urges the release tabs is counterclockwise.

18. The apparatus of claim 13, wherein the fiber optic cable assembly is an LC-type assembly.

19. The apparatus of claim 13, further comprising a second fiber optic cable assembly including a second fiber optic cable and a second release tab that connects the second fiber optic cable to the adapter, and wherein the actuator simultaneously engages each release tab and simultaneously urges each release tab into an unlatched position when the actuator is rotated.

* * * * *